No. 780,481. PATENTED JAN. 17, 1905.
J. CRAWFORD.
GATE LATCH.
APPLICATION FILED SEPT. 8, 1903. RENEWED NOV. 11, 1904.

Witnesses
J. Crawford, Inventor.
by
Attorneys

No. 780,481. Patented January 17, 1905.

UNITED STATES PATENT OFFICE.

JIM CRAWFORD, OF WEATHERFORD, TEXAS, ASSIGNOR TO BENJAMIN F. CHERRY AND JOE RENTZ, OF WEATHERFORD, TEXAS.

GATE-LATCH.

SPECIFICATION forming part of Letters Patent No. 780,481, dated January 17, 1905.

Application filed September 8, 1903. Renewed November 11, 1904. Serial No. 232,364.

*To all whom it may concern:*

Be it known that I, JIM CRAWFORD, a citizen of the United States, residing at Weatherford, in the county of Parker and State of Texas, have invented a new and useful Gate or Barn-Door Latch, of which the following is a specification.

This invention relates to the general class of latches, but is intended particularly to be employed in connection with swinging closures, such as gates, doors, or similar devices.

One of the principal objects of the invention is to provide a latch which will automatically lock when the gate is swung to a closed position and in such a manner that the gate will be positively held against opening unless the latch is released by a second operation.

A further object of the invention is to provide a simple, durable, and efficient latch at a minimum cost.

Further objects and advantages of this invention will appear in the following description, and the novel features thereof will be particularly pointed out in the appended claims, it being understood that changes in the form, proportion, and the minor details of construction may be resorted to without departing from the spirit or sacrificing any of the advantages of the invention.

Figure 1:
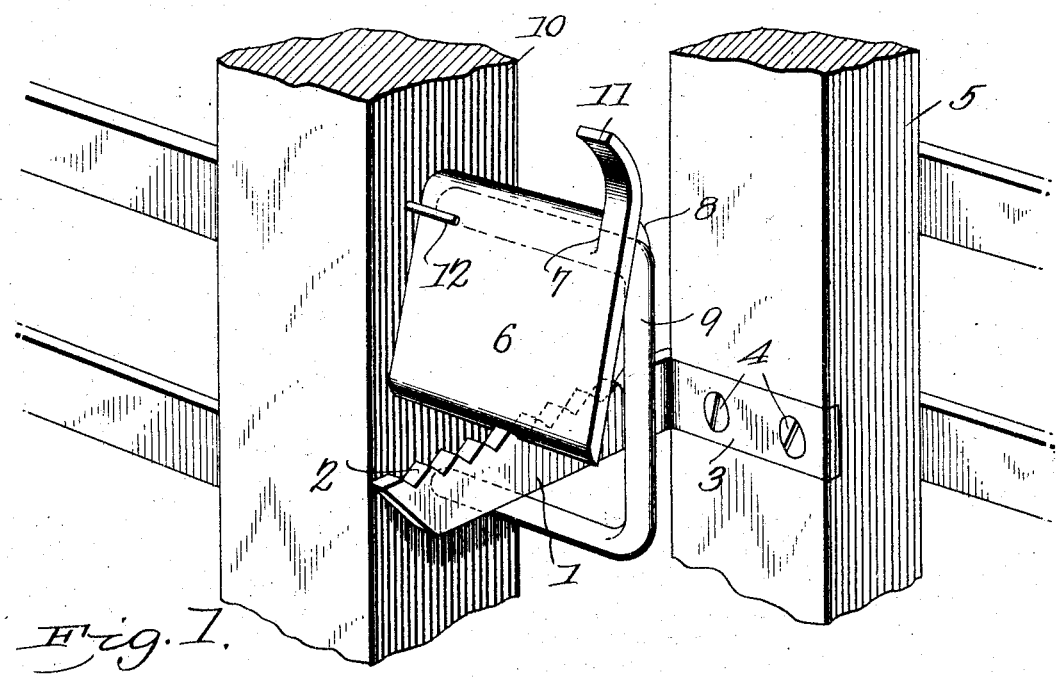
Figure 2:
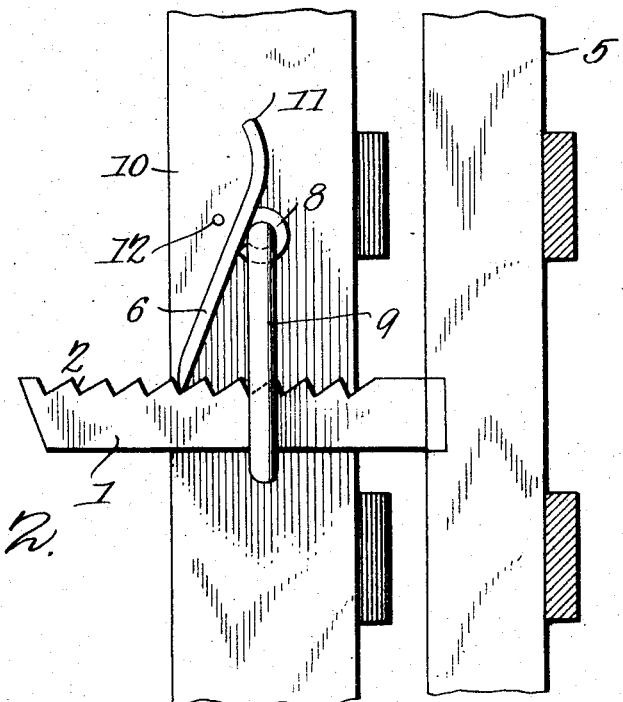

In the drawings, Figure 1 is a perspective view of the invention applied, and Fig. 2 is an end view of the same.

The latch consists of two members, a swinging gravitating dog and a rack-bar to be engaged by the dog. One of the members is to be fastened to the gate, and it is illustrated as comprising a bar 1, having teeth or serrations 2 in its upper edge, and a terminally-disposed right-angular projection 3, provided with openings through which suitable fastenings 4 may be inserted to engage the batten 5 of the gate to which the bar 1 is secured. The other member is carried by the fence-post, and it consists of a gravitating swinging dog 6, illustrated as being formed from a plate in which a slit 7 has been made, so that one edge of the plate can be rolled back upon itself to form a barrel 8 for the insertion of one arm of a staple 9, constituting a support to position the dog properly on the post 10, into which both arms of the staple are inserted. The unrolled portion of the slitted end of the dog projects upwardly to constitute a trip 11, which may be employed to swing the dog from a vertical toward a horizontal plane, whereby said dog will be swung out of engagement with the rack-bar 1, the upward movement being limited by a stop-pin 12, also driven into the post.

In operation when the parts are assembled the rack-bar 1 will be moved toward the swinging dog, the edge of which is spaced away from the lower arm of the staple. As the gate moves to a closing position the swinging dog will be caused to engage the rack-bar, which will pass between the edge of the dog and the lower arm of the staple.

The thrust of the bar caused by the movement of the gate will lift the lower edge of the dog, permitting it to drop back into one of the notches therein, so that the gate will be held against unlocking. Any outward stress upon the dog will be relieved by the connecting-bar 13, which forms the intermediate part of the staple. This staple also constitutes a guide for the bar 1 as well as allows for a certain amount of play of the plate and dog with relation to the bar owing to warping or a lateral movement of the fence-post.

Having thus described the invention, what I claim is—

1. A gate-latch comprising two members, one of which is a gravitating dog, having a split end, the end on one side of the slit being rolled back upon itself in tubular form, and the end on the other portion constituting a trip-finger, a fastening means in the tubular portion, and a second member having teeth to be engaged by the dog.

2. The combination with a post, of a staple driven in the post, a hinged plate on one of the parallel arms of the staple, normally resting against the intermediate connecting portion of the staple and spaced away from the remaining arm of the staple, and a gate having means for engagement with the plate.

3. The combination with a gate and a post of a staple driven in the post, a hinged dog having a portion of its edge curved around the upper arm of the staple and spaced away from the lower arm, said dog having an upstanding finger adjacent to the curved edge and a rack-bar on the gate to be engaged by the rack and movable between the lower arm of the staple and the edge of the dog.

4. The combination with a post and a gate, of a latch for holding the gate closed and comprising two members, one of which is a dog having a split end part of which is curved into a barrel, and the other part projecting upwardly to provide a finger, a fastening device for the dog having an intermediate portion against which the dog bears and a toothed complementary member carried by the gate.

In testimony that I claim the foregoing as my own I have hereto affixed my signature in the presence of two witnesses.

JIM CRAWFORD.

Witnesses:
E. F. PARKER,
I. C. CHERRY.